(12) United States Patent
Park et al.

(10) Patent No.: US 9,674,873 B2
(45) Date of Patent: Jun. 6, 2017

(54) METHOD FOR INFORMING IDENTIFICATION OF A UE AND DEVICE THEREFOR

(71) Applicant: LG ELECTRONICS INC., Seoul (KR)

(72) Inventors: Sungjun Park, Seoul (KR); Sunghoon Jung, Seoul (KR); Seungjune Yi, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 49 days.

(21) Appl. No.: 14/650,405

(22) PCT Filed: Feb. 11, 2014

(86) PCT No.: PCT/KR2014/001115
§ 371 (c)(1),
(2) Date: Jun. 8, 2015

(87) PCT Pub. No.: WO2014/157829
PCT Pub. Date: Oct. 2, 2014

(65) Prior Publication Data
US 2015/0304799 A1    Oct. 22, 2015

Related U.S. Application Data

(60) Provisional application No. 61/806,408, filed on Mar. 29, 2013.

(51) Int. Cl.
*H04W 8/00*    (2009.01)
*H04W 72/04*    (2009.01)
(Continued)

(52) U.S. Cl.
CPC ....... *H04W 74/0833* (2013.01); *H04W 4/005* (2013.01); *H04W 8/005* (2013.01);
(Continued)

(58) Field of Classification Search
CPC . H04W 4/005; H04W 72/048; H04W 74/004; H04W 76/00
See application file for complete search history.

(56) References Cited

U.S. PATENT DOCUMENTS

2010/0169732 A1    7/2010  Wu
2011/0222475 A1    9/2011  Hole et al.
(Continued)

FOREIGN PATENT DOCUMENTS

WO    2012/174709    12/2012

OTHER PUBLICATIONS

International Search Report and Written Opinion for International Patent Application No. PCT/KR2014/001262, dated Jun. 20, 2014, 11 pages.
(Continued)

*Primary Examiner* — Ayaz Sheikh
*Assistant Examiner* — Debebe Asefa
(74) *Attorney, Agent, or Firm* — Lee Hong Degerman Kang & Waimey

(57) ABSTRACT

The present invention relates to a wireless communication system. More specifically, the present invention relates to a method and a device for informing identification of a UE (User Equipment) in the wireless communication system, the method comprising: receiving information related to a size of data to be transmitted to or from the UE, determining whether the UE is considered as the MTC_UE (Machine Type Communication _UE) or not based on the information; and informing a network that the UE is the MTC_UE by performing the MTC_UE specific access.

12 Claims, 14 Drawing Sheets

(51) Int. Cl.
*H04W 74/00* (2009.01)
*H04W 76/00* (2009.01)
*H04W 74/08* (2009.01)
*H04W 72/12* (2009.01)
*H04W 72/14* (2009.01)
*H04W 4/00* (2009.01)

(52) U.S. Cl.
CPC ..... *H04W 72/048* (2013.01); *H04W 72/1284* (2013.01); *H04W 72/14* (2013.01); *H04W 74/004* (2013.01); *H04W 76/00* (2013.01)

(56) References Cited

U.S. PATENT DOCUMENTS

| | | |
|---|---|---|
| 2011/0299492 A1 | 12/2011 | Lee et al. |
| 2012/0163311 A1 | 6/2012 | Park |
| 2012/0196608 A1 | 8/2012 | Ting et al. |
| 2012/0282956 A1 | 11/2012 | Kim et al. |
| 2012/0320842 A1 | 12/2012 | Jeong et al. |
| 2013/0034059 A1 | 2/2013 | Lee et al. |
| 2013/0148607 A1* | 6/2013 | Yu .......... H04W 8/186 370/329 |
| 2015/0304799 A1* | 10/2015 | Park .......... H04W 76/00 370/329 |

OTHER PUBLICATIONS

3GPP TR 36.824 V11.0.0, "3GPP; TSGRAN; E-UTRA; LTE Coverage Enhancements (Release 11)," Jun. 2012, 19 pages.
United States Patent and Trademark Office Application U.S. Appl. No. 14/654,618, Office Action dated Jul. 28, 2016, 15 pages.
PCT International Application No. PCT/KR2014/001115, Written Opinion of the International Searching Authority dated May 23, 2014, 10 pages.

* cited by examiner

FIG. 3
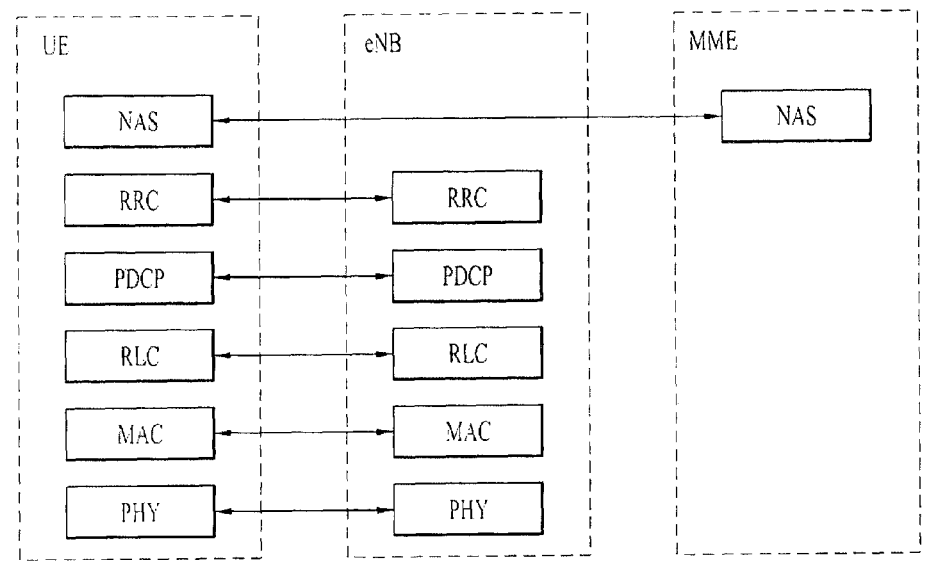
( a ) Control-Plane Protocol Stack
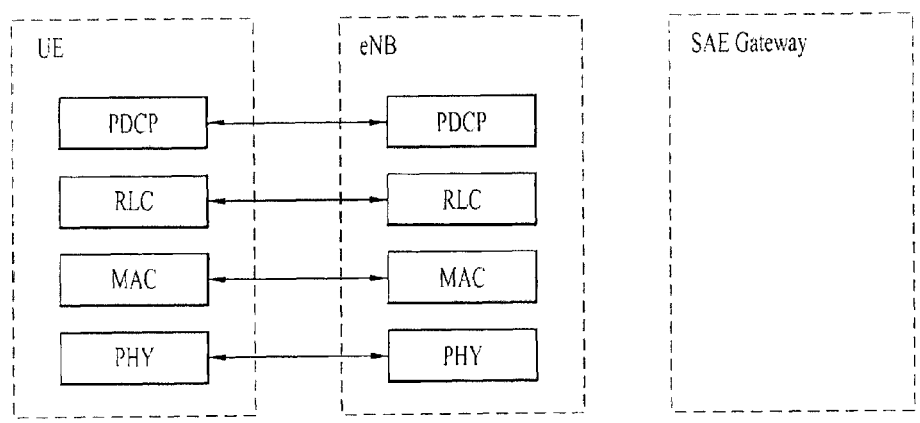
( b ) User-Plane Protocol Stack FIG. 7A
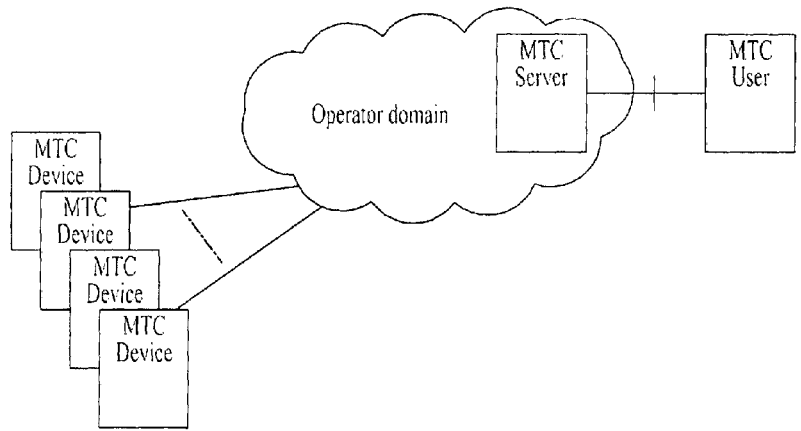
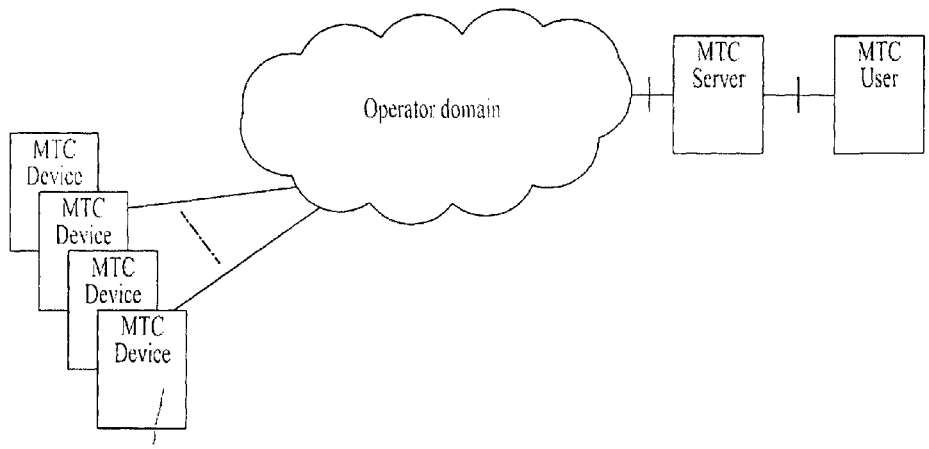

METHOD FOR INFORMING IDENTIFICATION OF A UE AND DEVICE THEREFOR

CROSS-REFERENCE TO RELATED APPLICATIONS

This application is the National Stage filing under 35 U.S.C. 371 of International Application No. PCT/KR2014/001115, filed on Feb. 11, 2014, which claims the benefit of U.S. Provisional Application No. 61/806,408, filed on Mar. 29, 2013, the contents of which are all hereby incorporated by reference herein in their entirety.

TECHNICAL FIELD

The present invention relates to a wireless communication system and, more particularly, to a method for informing identification of a UE and a device therefor.

BACKGROUND ART

As an example of a mobile communication system to which the present invention is applicable, a 3rd Generation Partnership Project Long Term Evolution (hereinafter, referred to as LTE) communication system is described in brief.

Machine type communication (MTC) refers to a communication scheme between one or more machines and is also referred to as machine-to-machine (M2M) communication. Here, a machine refers to an entity which does not require direct human operation or intervention. For example, examples of the machine may include not only a device including a mobile communication module, such as a meter or a vending machine, but also a user equipment such as a smartphone which is capable of automatically accessing a network without operation/intervention of a user to perform communication. Various examples of such a machine are referred to as an MTC device or terminal in the present specification. That is, MTC refers to communication performed by one or more machines (that is, MTC devices) without human operation/intervention.

MTC may include communication (e.g., device-to-device (D2D) communication) between MTC devices and communication between an MTC device and an MTC application server. Examples of communication between an MTC device and an MTC application server include communication between a vending machine and a server, communication between a point of sale (POS) device and a server and an electric meter, and communication between a gas meter or a water meter and a server. MTC-based applications may include security, transportation, healthcare, etc. FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for efficiently informing identification of a UE in a wireless communication system. The technical problems solved by the present invention are not limited to the above technical problems and those skilled in the art may understand other technical problems from the following description.

Technical Solution

The object of the present invention can be achieved by providing a method for informing identification of a UE by a UE in the wireless communication system, the method comprising: receiving information related to a size of data to be transmitted to or from the UE; determining whether the UE is considered as the MTC_UE or not based on the information; and informing a network that the UE is the MTC_UE by performing the MTC_UE specific access.

In another aspect of the present invention, provided herein is a UE (User Equipment) for informing identification in the wireless communication system, the UE comprising: an RF module; and a processor to control the RF module, and wherein the processor configured to receive information related to a size of data to be transmitted to or from the UE, to determine whether the UE is considered as the MTC_UE or not based on the information, to inform a network that the UE is the MTC_UE by performing the MTC_UE specific access.

Preferably, the performing the MTC_UE specific access includes a random access preamble dedicated for the MTC_UE transmission.

Preferably, the information is received through system information or a paging message.

Preferably, the information further comprises information related to a random access preamble dedicated for the MTC_UE.

Preferably, if the information is received through system information, the information comprises a parameter indicating a predetermined size of data available for uplink transmission, and wherein the UE identifies the UE is the MTC_UE if a data size to be transmitted by the UE is less than or equal to the parameter.

Preferably, if the information is received through paging message, the information comprises a flag indicating whether the paged UE is MTC_UE or not, and wherein the UE identifies the UE is the MTC_UE if the flag indicates the paged UE is MTC_UE.

Advantageous Effects

According to the present invention, channel information can be efficiently transmitted in a wireless communication system. Specifically, random access process can be efficiently performed in the MTC system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 3 is a diagram showing a control plane and a user plane of a radio interface protocol between a UE and an E-UTRAN based on a 3rd generation partnership project (3GPP) radio access network standard;

FIG. 7A is a diagram showing a communication scenario with MTC devices communicating with MTC server.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
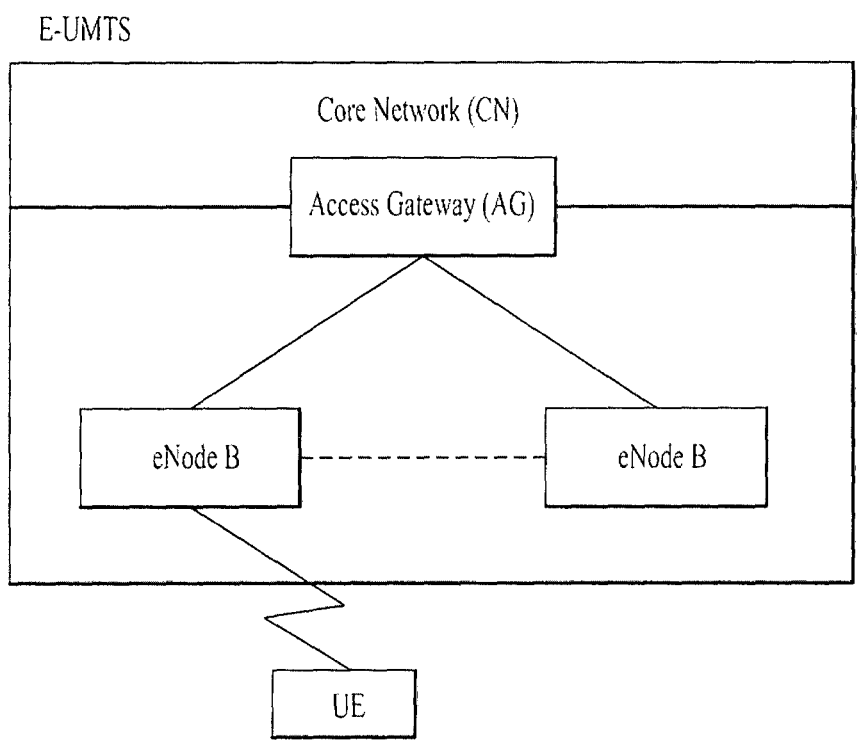
FIG. 1 is a diagram showing a network structure of an Evolved Universal Mobile Telecommunications System (E-UMTS) as an example of a wireless communication system.
Figure 2A:
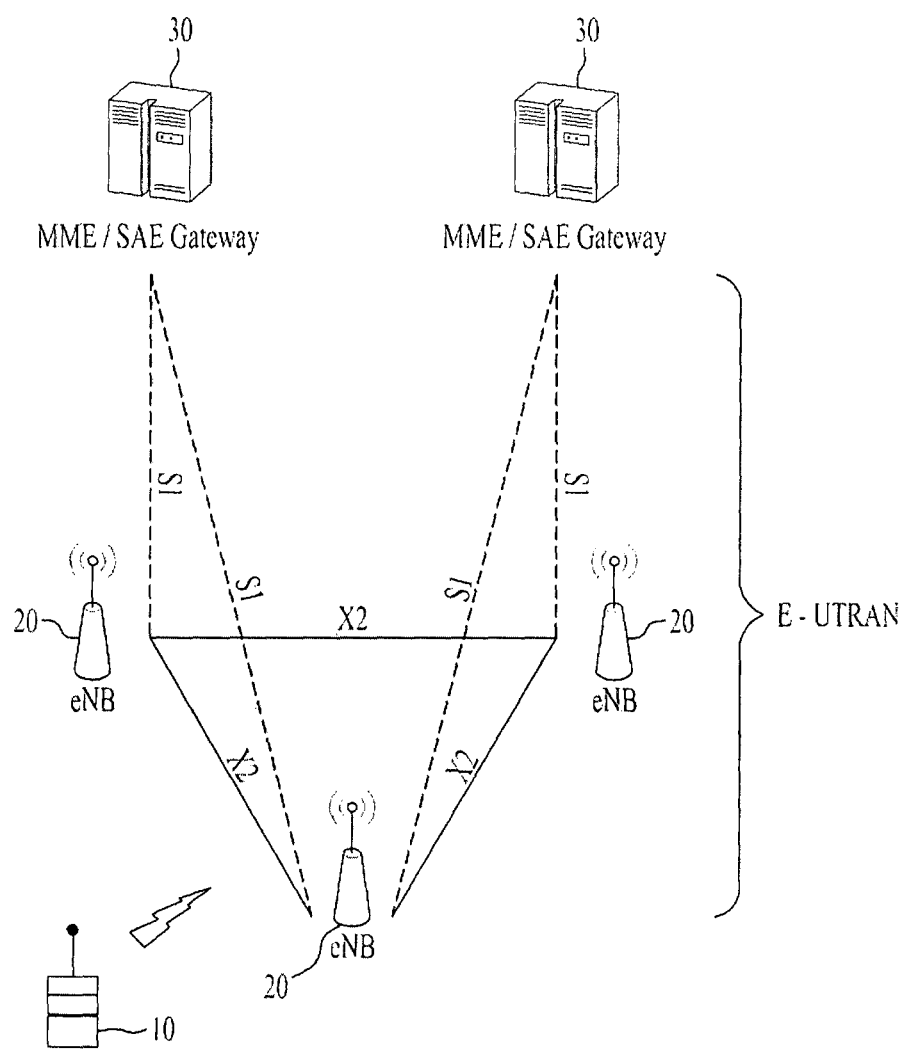
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
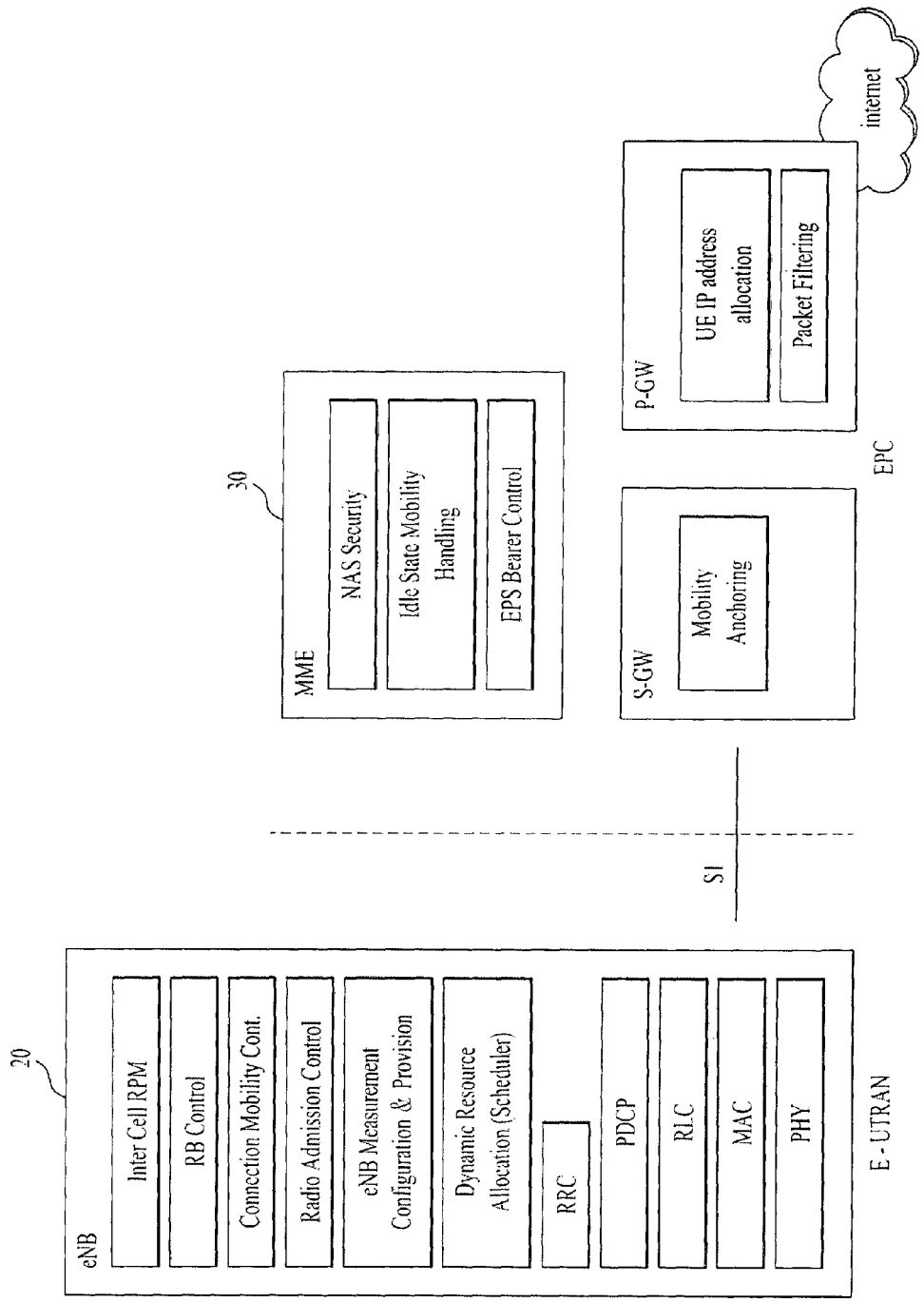
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2B is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths. Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
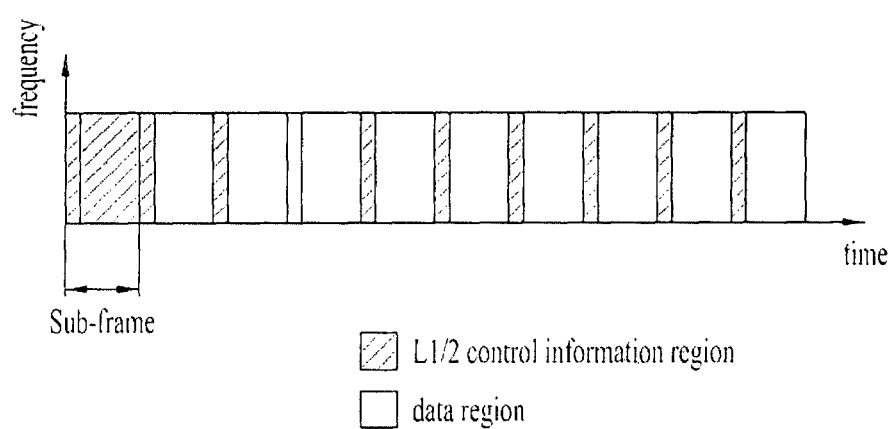
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

Figure 5:
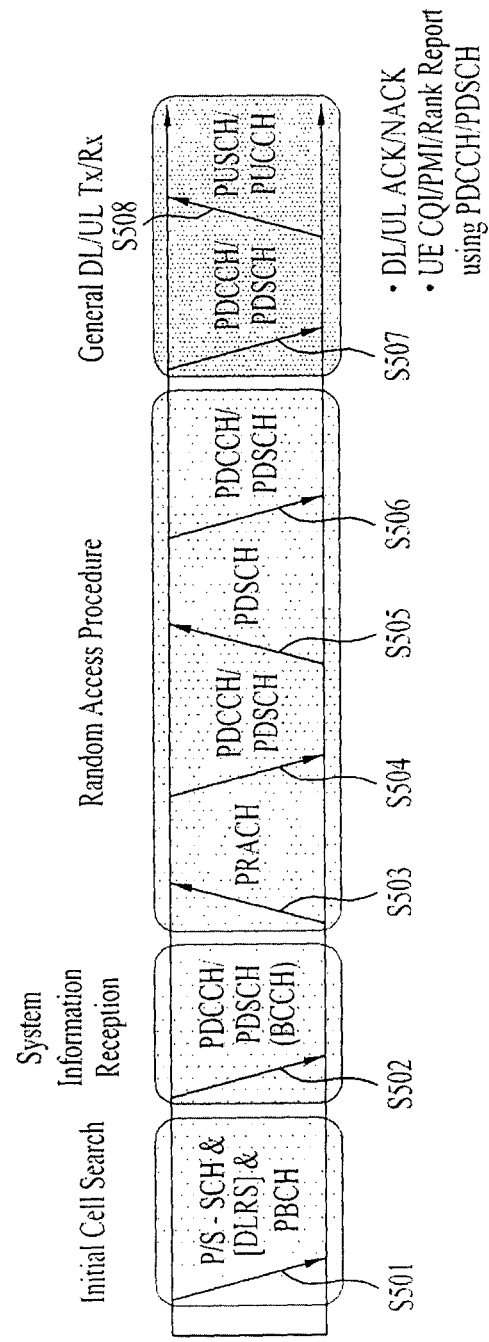
FIG. 5 is a diagram showing physical channels used in a 3GPP system and a general signal transmission method using the same.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information. FIG. 5 is a diagram showing physical channels used in a 3GPP system and a general signal transmission method using the same.

When a UE is powered on or enters a new cell, the UE performs an initial cell search operation such as synchronization with an eNB (S501). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S502).

When the UE initially accesses the eNB or has no radio resources for signal transmission, the UE may perform a random access procedure (RACH) with respect to the eNB (steps S503 to S506). To this end, the UE may transmit a specific sequence as a preamble through a physical random access channel (PRACH) (S503) and receive a response message to the preamble through the PDCCH and the PDSCH corresponding thereto (S504). In the case of contention-based RACH, the UE may further perform a contention resolution procedure.

After the above procedure, the UE may receive PDCCH/PDSCH from the eNB (S507) and may transmit a physical uplink shared channel (PUSCH)/physical uplink control channel (PUCCH) to the eNB (S508), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 6:
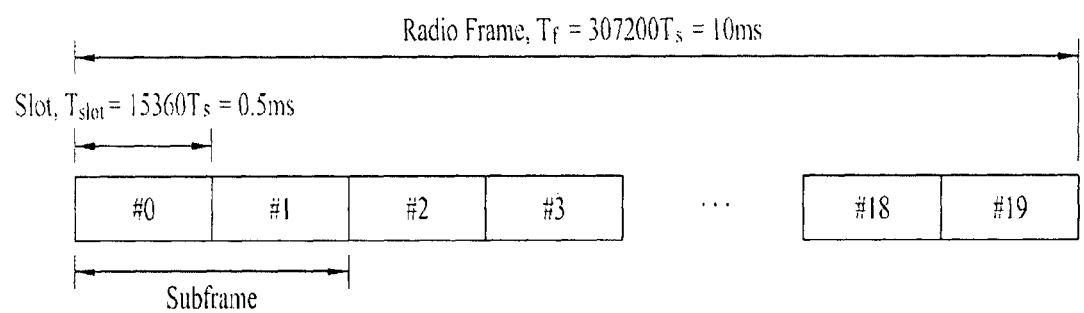
FIG. 6 is a diagram showing the structure of a radio frame used in a Long Term Evolution (LTE) system.

FIG. 6 is a diagram showing the structure of a radio frame used in an LTE system.

Referring to FIG. 6, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10-8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Hereinafter, an RRC state of a UE and an RRC connection method will be described:

The RRC state indicates whether the RRC layer of the UE is logically connected to the RRC layer of the E-UTRAN. When the RRC connection is established, the UE is in a RRC_CONNECTED state. Otherwise, the UE is in a RRC_IDLE state.

The E-UTRAN can effectively control UEs because it can check the presence of RRC_CONNECTED UEs on a cell basis. On the other hand, the E-UTRAN cannot check the presence of RRC_IDLE UEs on a cell basis and thus a CN manages RRC_IDLE UEs on a TA basis. A TA is an area unit larger than a cell. That is, in order to receive a service such as a voice service or a data service from a cell, the UE needs to transition to the RRC_CONNECTED state.

In particular, when a user initially turns a UE on, the UE first searches for an appropriate cell and camps on the cell in the RRC_IDLE state. The RRC_IDLE UE transitions to the RRC_CONNECTED state by performing an RRC connection establishment procedure only when the RRC_IDLE UE needs to establish an RRC connection. For example, when uplink data transmission is necessary due to call connection attempt of a user or when a response message is transmitted in response to a paging message received from the E-UTRAN, the RRC_IDLE UE needs to be RRC connected to the E-UTRAN.

Figure 7B:
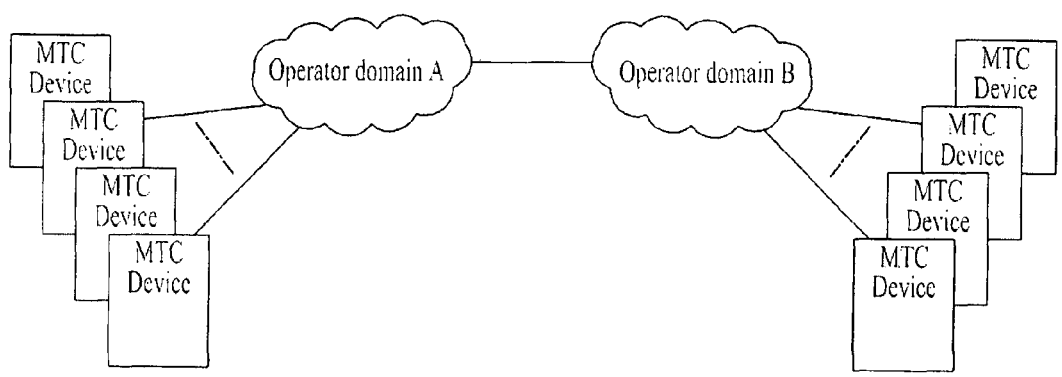
FIG. 7B is a diagram showing MTC devices communicating directly with each other without intermediate MTC server.

FIG. 7A is a diagram showing a communication scenario with MTC devices communicating with MTC server. And FIG. 7B is a diagram showing MTC devices communicating directly with each other without intermediate MTC server.

Machine-type communication is a form of data communication which involves one or more entities that do not necessarily need human interaction. For the purpose of the present document, the term MTC is used for the purpose to describe use-cases and illustrate the diverse characteristics of machine-type communication services.

A service optimized for machine type communications differs from a service optimized for Human to Human communications. Machine-type communications is different to current mobile network communication services as it involves that different market scenarios, data communications, lower costs and effort, a potentially very large number of communicating terminals with, to a large extent, and little traffic per terminal.

For MTC communication the following communication scenarios can be identified: a) MTC devices communicating with one or more MTC server (as FIGS. 7A) and b) MTC devices communicating with each other (as FIG. 7B).

In case of a) MTC devices communicating with one or more MTC server, the network operator provides network connectivity to MTC server(s). This applies to MTC server(s) controlled by the network operator or to MTC server(s) not controlled by the network operator. The MTC device and the MTC server it is communicating with may implement a service enablement framework to provide generic functionality for applications. The MTC device may implement multiple instances of service enablement frameworks, each communicating with a different MTC server (FIG. 7A).

In case of b) MTC devices communicating with each other, the communication scenario where the MTC devices communicate directly without intermediate MTC server is not considered in this release of the specification (FIG. 7B).

In the LTE(-A) system, when the BS intends to transmit information or data to the device, there are a plurality of methods to transmit the DL data. The transmission from the eNB to the UE means downlink transmission. The downlink transmission comprises a UE-specific downlink transmission and a common (Non-UE specific) downlink transmission. The UE specific downlink transmission is referred to beam-formed transmission intended for a specific terminal or group.

Meanwhile, Machine-Type Communication (MTC) applications do not all have the same characteristics. This implies that not every system optimization is suitable for every MTC application. Therefore, MTC features are defined to provide structure for the different system optimization possibilities that can be invoked. MTC features provided to a particular subscriber are identified in the subscription. MTC features can be individually activated.

The following MTC features have been defined, i) Low Mobility, ii) Time Controlled, iii) Small Data Transmissions, iv) Infrequent Mobile Terminated, and v) MTC Monitoring etc.

Especially, many MTC applications send or receive small amounts of data. This characteristic of MTC application may lead to inefficient use of resources in the 3GPP system because many procedures including connection establishment and bearer configuration that cause signaling overhead always need to be performed before such small data transfer. This key issue identifies the solutions to transmit and receive small amount of data efficiently through 3GPP system.

The Small Data Transmissions for MTC (hereafter, SDT_UE) have following features:

i) The system shall support transmissions of small amounts of data with minimal network impact (e.g. signaling overhead, network resources, delay for reallocation).

ii) Before transmission of small amount of data, the MTC device may be attached or detached to/from the network. Herein "transmission" implies either sending or receiving small amount of data.

iii) The 3GPP system shall be able to count the number of small data transmissions per subscription e.g. for charging or statistical purposes. Herein, observed size of many of the instances of data exchanges is on the order of 1K (1024) octets and charging and accounting of small data transmissions between operators can be done on a bulk basis.

Figure 8:
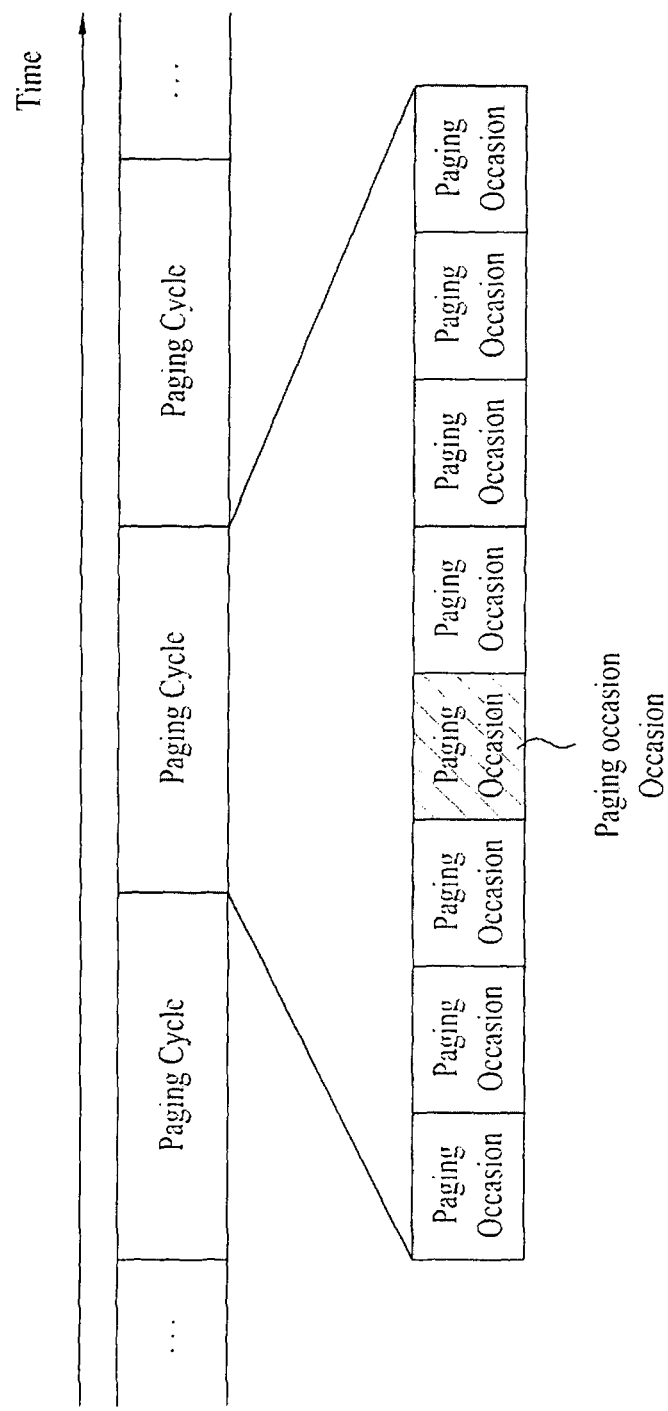
FIG. 8 is a diagram for describing a transmission of a paging channel.

FIG. 8 is a diagram for describing a transmission of a paging channel. A transmission of a paging channel is described with reference to FIG. 8 as follows.

First of all, discontinuous reception (DRX) is described. The discontinuous reception (DRX) is an operation that relates to when a base station will send information on allocation of a radio resource to a user equipment in the course of a communication between the base station and the base station. If a user equipment monitors a downlink (DL) channel for carrying information related to the radio resource allocation, and more particularly, PDCCH all the time, it may cause a problem of power consumption. To solve this problem, a base station transmits radio resource allocation information to a user equipment on PDCCH in a specific time only. The user equipment receives the radio resource allocation information via the PDCCH in the specific time only. Since the user equipment needs not to monitor the PDCCH during other time except the specific time, the user equipment may be able to reduce its power consumption by turning off its receiving module.

When a paging message is received, a user equipment is able to perform a discontinuous reception (DRX) for the purpose of reduction of power consumption. For this, a network configures several paging occasions in each time cycle called a paging DRX cycle and enables a specific user equipment to perform a reception attempt and acquisition of a paging message on a specific paging occasion only. The user equipment does not receive a paging channel during the rest of time except the specific paging occasion. And, one paging occasion corresponds to one TTI.

An operation of receiving a paging channel in a user equipment is described in detail as follows.

First of all, a user equipment receives a downlink (DL) channel on each designated paging occasion. In particular, the user equipment wakes up in a subframe matching the corresponding paging occasion and then receives PDCCH. In doing so, if the user equipment receives P-RNTI (paging-RNTI) corresponding to a paging via the PDCCH, the user equipment receives a radio resource indicated by the PDCCH. On the radio resource indicated by the PDCCH, a substantial paging message is transmitted. The user equipment receives the paging message and then checks whether an identifier (e.g., identifier identical to IMSI (international mobile subscriber identity) assigned to the user equipment) of the user equipment exists. If there is a matched identifier, the user equipment informs an upper stage that a paging has arrived.

Figure 9:
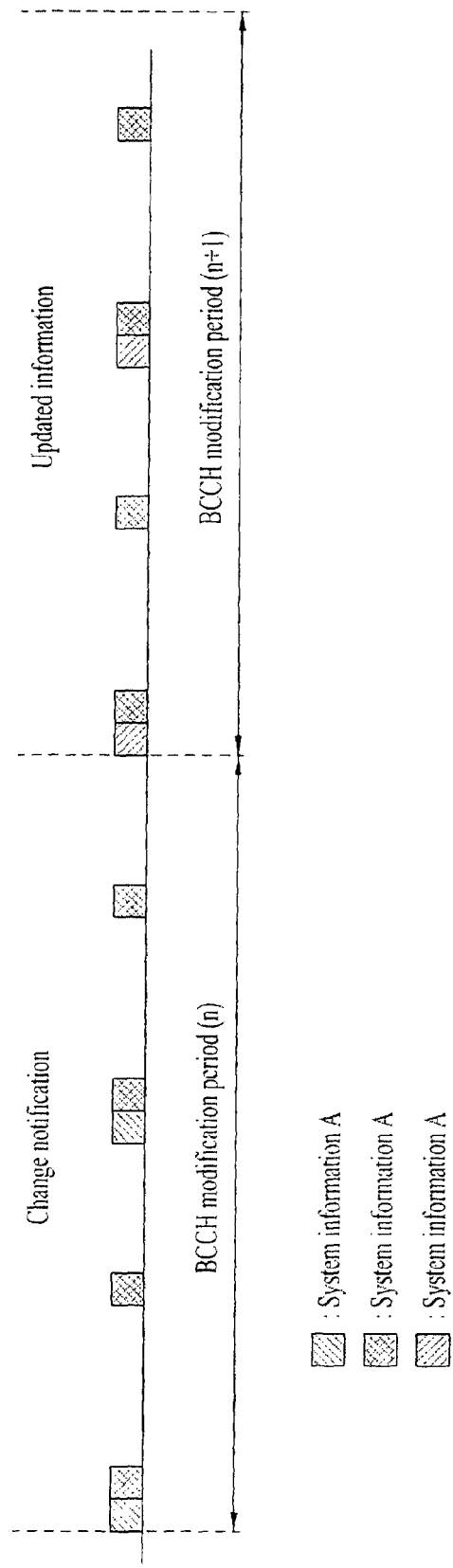
FIG. 9 is a diagram for describing an information notification of system information modification and a system information transmitting method.

FIG. 9 is a diagram for describing an information notification of system information modification and a system information transmitting method. System information (SI) includes parameters required for a user equipment to obtain other information from a base station and the like. If system information (SI) is changed, it may be necessary to inform a user equipment that the system information has been changed. This operation is described in detail as follows.

Notification of system information change means that a base station informs user equipments of information on a change of system information. This notification should be performed in the first place when a base station changes system information. The change of system information takes place in specific radio frames only. For the notification of the system information change, a concept of modification period is used. The modification period includes a specific number of radio frames. The system information may be transmitted plural times with the same content in one modification period. A base station performs the notification of the change of the system information in nth modification period and is then able to transmit the changed system information to a user equipment in (n+1)th modification period.

FIG. 9 is a diagram for describing an information notification of system information modification and a system information transmitting method. If a user equipment receives a change notification in a modification period (n), a user equipment operates in a manner of obtaining a new system information (e.g., an updated system information of a next modification period (n+1). The user equipment applies a previous system information until obtaining the new system information.

Paging message is used to notify a system information change to user equipments in RRC_IDLE mode and user equipments in RRC_CONNECTED mode both. The paging message may contain system information modification (systemInfoModification) information indicating the system information change. If a user equipment receives a paging message containing systemInfoModification information in a specific modification period, the user equipment may be able to recognize that system information will be changed in a next modification period.

Yet, the paging message indicates a fact of the system information change only but does not contain information indicating which system information has been changed. In particular, the user equipment may be able to recognize information, which indicates whether a change of system information will occur, from presence/absence of the systemInfoModification information within the paging message.

System information is divided into the MasterInformationBlock (MIB) and a number of SystemInformationBlocks (SIBs). The MIB defines the most essential physical layer information of the cell required to receive further system information. Table 1 lists SIB type.

TABLE 1

| System Information Block Type | content |
| --- | --- |
| Type1 | information relevant when evaluating if a UE is allowed to access a cell and defines the scheduling of other system information blocks |
| Type2 | information relevant when evaluating if a UE is allowed to access a cell and defines the scheduling of other system information blocks; |
| Type3 | cell re-selection information, mainly related to the serving cell |
| Type4 | information about the serving frequency and intra-frequency neighbouring cells relevant for cell re-selection (including cell re-selection parameters common for a frequency as well as cell specific re-selection parameters); |
| Type5 | information about other E-UTRA frequencies and inter-frequency neighbouring cells relevant for cell re-selection (including cell re-selection parameters common for a frequency as well as cell specific re-selection parameters); |
| Type6 | information about UTRA frequencies and UTRA neighbouring cells relevant for cell re-selection (including cell re-selection parameters common for a frequency as well as cell specific re-selection parameters); |
| Type7 | information about GERAN frequencies relevant for cell re-selection (including cell re-selection parameters for each frequency); |
| Type8 | information about CDMA2000 frequencies and CDMA2000 neighbouring cells relevant for cell re-selection (including cell re-selection parameters common for a frequency as well as cell specific re-selection parameters); |
| Type9 | a home eNB name (HNB name); |
| Type10 | an ETWS primary notification |
| Type11 | an ETWS secondary notification |
| Type12 | a CMAS warning notification |
| Type13 | MBMS-related information |

The MIB is mapped on the BCCH and carried on BCH while all other SI messages are mapped on the BCCH and dynamically carried on DL-SCH where they can be identified through the SI-RNTI (System Information RNTI). Both the MIB and SystemInformationBlockType1 use a fixed schedule with a periodicity of 40 and 80 ms respectively while the scheduling of other SI messages is flexible and indicated by SystemInformationBlockType1.

The eNB may schedule DL-SCH transmissions concerning logical channels other than BCCH in the same subframe as used for BCCH. The minimum UE capability restricts the BCCH mapped to DL-SCH e.g. regarding the maximum rate.

The Paging message is used to inform UEs in RRC_IDLE and UEs in RRC_CONNECTED about a system information change.

System information may also be provided to the UE by means of dedicated signalling e.g. upon handover.

Figure 10:
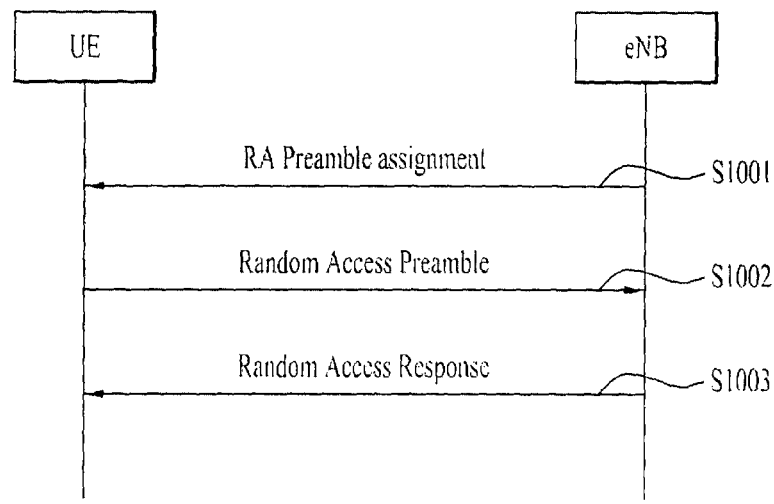
FIG. 10 is a diagram of an example method for performing a non-contention-based random access procedure.
Figure 11:
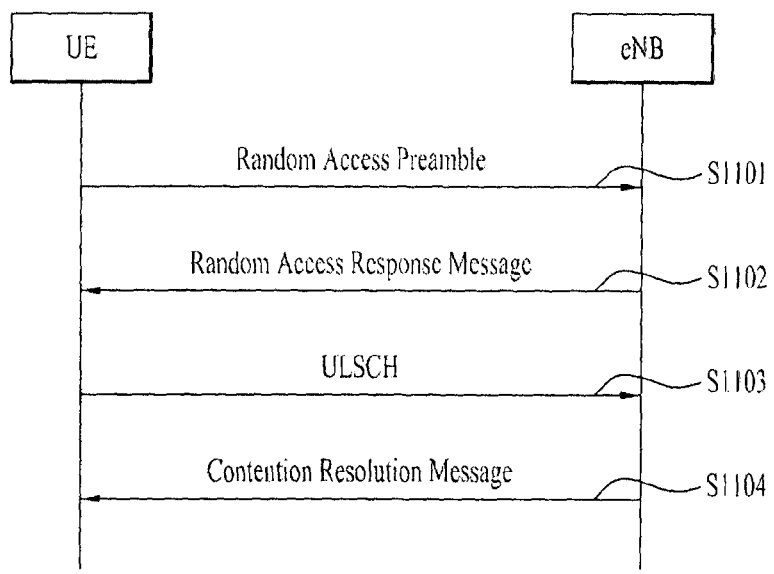
FIG. 11 is a diagram of an example method for performing a contention-based random access procedure.

FIGS. 10 and 11 are views illustrating an operating procedure of a terminal (UE) and a base station (eNB) in random access procedure. FIG. 10 is corresponding to non-contention based random access procedure and FIG. 11 is corresponding to contention based random access procedure.

The random access procedure takes two distinct forms. One is a contention based (applicable to first five events) random access procedure and the other one is a non-contention based (applicable to only handover, DL data arrival and positioning) random access procedure. The non-contention based random access procedure is also called as dedicated RACH process.

Normal DL/UL transmission can take place after the random access procedure. An RN supports both contention-based and non-contention-based random access. When an RN performs the random access procedure, it suspends any current RN subframe configuration, meaning it temporarily disregards the RN subframe configuration. The RN subframe configuration is resumed at successful random access procedure completion.

Regarding FIG. 10, FIG. 10 shows the non-contention based random access procedure. As described above, a non-contention based random access procedure may be performed in a handover procedure and when the random access procedure is requested by a command of an eNode B. Even in these cases, a contention based random access procedure may be performed.

First, it is important that a specific random access preamble without the possibility of collision is received from the eNode B, for the non-contention based random access procedure. Methods of receiving the random access preamble may include a method using a handover command and a method using a Physical Downlink Control Channel (PDCCH) command. The UE receives an assigned random access preamble (S1001).

The UE transmits the preamble to the eNode B after receiving the assigned random access preamble from the eNode B as described above (S1002).

The UE attempts to receive a random access response within a random access response reception window indicated by the eNode B through a handover command or system information after transmitting the random access preamble in step S1002 (S1003). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S1002.

In the non-contention based random access procedure, it is determined that the random access procedure is normally performed, by receiving the random access response information, and the random access procedure may be finished.

FIG. 11 is a view illustrating an operating procedure of a UE and an eNB in a contention based random access procedure.

First, the UE may randomly select a single random access preamble from a set of random access preambles indicated through system information or a handover command, and select and transmit a Physical Random Access Channel (PRACH) capable of transmitting the random access preamble (S1101).

A method of receiving random access response information is similar to the above-described non-contention based random access procedure. That is, the UE attempts to receive its own random access response within a random access response reception window indicated by the eNode B through the system information or the handover command, after the random access preamble is transmitted in step S1101, and receives a Physical Downlink Shared Channel (PDSCH) using random access identifier information corresponding thereto (S1102). Accordingly, the UE may receive a UL Grant, a Temporary C-RNTI, a TAC and the like.

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in a Msg3 buffer.

The UE uses the received UL Grant so as to transmit the data (that is, the message 3) to the eNode B (S1103). The message 3 should include a UE identifier. In the contention based random access procedure, the eNode B may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

After transmitting the data with its identifier through the UL Grant included in the random access response, the UE waits for an indication (instruction) from the eNode B for contention resolution. That is, the UE attempts to receive the PDCCH so as to receive a specific message (S1104). Here, there are two schemes to receive the PDCCH. As described above, the UE attempts to receive the PDCCH using its own cell identifier if the message 3 transmitted in correspondence with the UL Grant is transmitted using the UE's cell identifier, and the UE attempts to receive the PDCCH using the temporary C-RNTI included in the random access response if the identifier is its unique identifier. Thereafter, in the former scheme, if the PDCCH is received through its own cell identifier before the contention resolution timer is expired, the UE determines that the random access procedure has been normally performed and completes the random access procedure. In the latter scheme, if the PDCCH is received through the temporary C-RNTI before the contention resolution timer has expired, the UE checks data transferred by the PDSCH indicated by the PDCCH. If the unique identifier of the UE is included in the data, the UE determines that the random access procedure has been normally performed and completes the random access procedure.

Especially, in the step of S1001 and S1101, the single random access preamble can further comprise information indicating identification of the UE.

Figure 12:
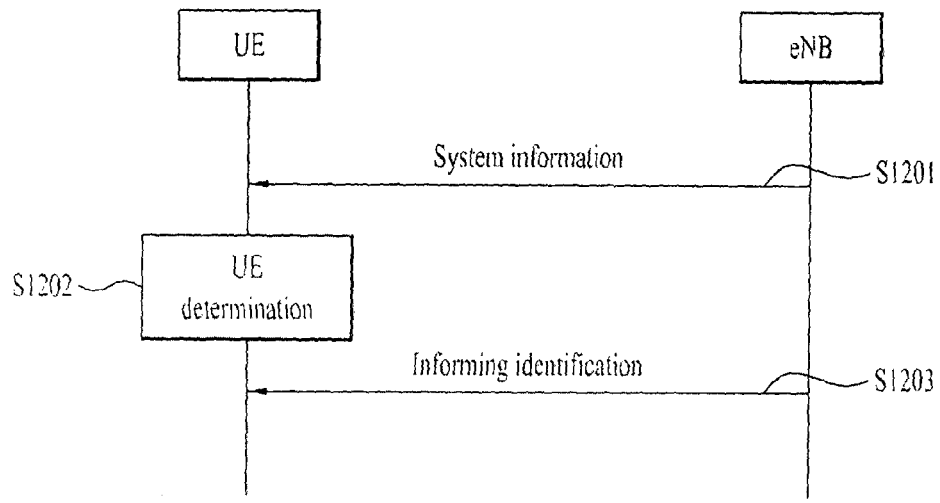
FIGS. 12 and 13 are conceptual diagrams illustrating informing identification of the UE according to embodiments of the present invention.

FIG. 12 is a conceptual diagram illustrating a method for informing identification of a UE according to embodiments of the present invention.

In following invention, a UE which is subject to Small Data Transmission is defined as SDT_UE. A UE which is not subject to Small Data Transmission is defined as non-SDT_UE. The UE may be either SDT_UE or non-SDT UE according to the specified conditions, rules, indication and etc.

The eNB may broadcast the system information including parameters for SDT_UEs (S1201). The parameters include following.

Support of SDT_UEs: This parameter indicates whether the eNB supports SDT_UEs or not.
  Criterion of SDT_UE: This parameter provides for the UE to determine whether the UE is SDT_UE or not. The criterion can be a size of the data available for transmission in UL. Validity timer for SDT_UE
  This provide the valid duration how long the UE can consider itself to be SDT_UE. For example, if this parameter indicates 1 second, once the UE considers itself to be SDT_UE according to the criterion of SDT_UE, the UE becomes SDT_UE for 1 second. If 1 second is elapsed, the UE becomes non-SDT_UE unless the criterion is met again.
  RACH configuration for SDT_UEs: This parameter provides the configuration for preamble grouping for SDT_UEs. If the UE is SDT_UE, then it can use the configuration.

Based on the parameters for SDT_UEs, the UE may determine whether it can be considered as SDT_UE or not when the UE needs to establish RRC connection to the eNB (S1202). In the step of S1202, the UE can determine that the UE is the SDT_UE using the parameter of criterion of SDT_UE. For example, if this parameter indicates 100 bytes as criterion of SDT_UEs, the UE considers itself to be SDT_UE if the data size is less than or equal to 100 bytes. Vice versa, the UE considers itself to be not SDT_UE if the data size is larger than 100 bytes. Note that the IP packets in UL or data on data radio bearers (DRBs) in UL can be only considered as data available for transmission.

If the UE is considered as SDT_UE, the UE may inform a network that the UE is the SDT_UE by performing the SDT_UE specific access (S1203). The SDT_UE specific access comprises a random access preamble transmission. When the SDT_UE transmits the random access preamble to inform the identification, the random access preamble may be used for SDT_UE indicated in the system information. Upon the received random access preamble, the eNB knows that the UE is SDT_UE.

Figure 13:
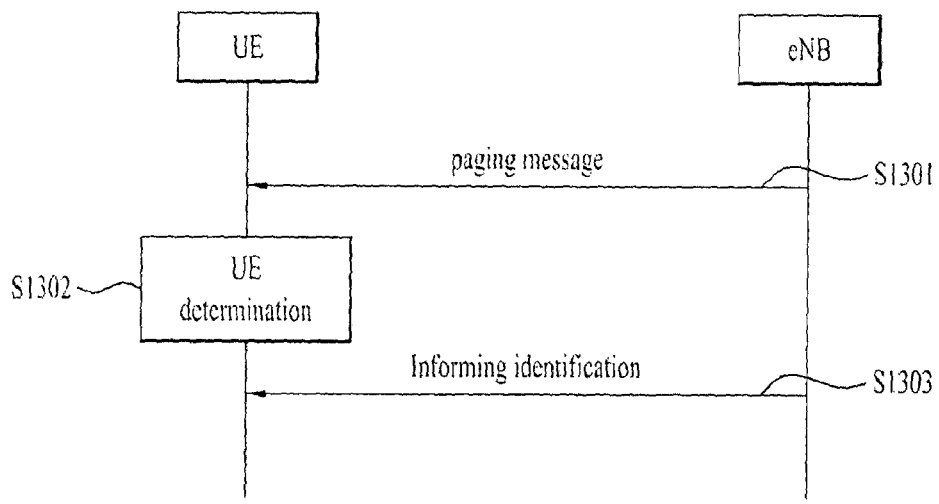

FIG. 13 is a conceptual diagram illustrating a method for informing identification of a UE according to embodiments of the present invention.

When an IP packet arrives in the S-GW, the S-GW buffers the IP packets and sends notification of the IP packet arrivals to the MME. If the S-GW determines that the buffered IP packets are considered as small data, the S-GW includes the small data indication in the notification.

The notification including the small data indication allows the eNB to include further information that is used for resources optimization in the paging message. The MME may page. The eNB can broadcast the paging message including parameters for SDT_UEs (S1301). Then, the eNB may further include the following information in the paging message.

SDT_UE flag: This information provides whether the paged UE is SDT_UE or not. If the SDT_UE flag is set, the UE is considered to be SDT_UE.
  Validity timer for SDT_UE: This information provides how long the UE can be considered to be SDT_UE once the SDT_UE flag is set. If the provided validity timer for SDT_UE is elapsed, the UE is considered to be not SDT_UE.
  Random Access resources information (including Random Access Preamble and PRACH Mask Index): This information provides the Random Access resources (e.g., dedicated preamble) that the paged UE can use for the initial access to the eNB. If the UE receives this information, the UE is considered to be SDT_UE.
  Validity timer value for Random Access resources: This information provides the valid duration for use of the Random Access resources. If the valid duration is elapsed, the UE consider the Random Access resources to be not valid. If the Random Access resources are considered not valid, the UE also is considered to be not SDT_UE.

Based on the parameters for SDT_UEs, the UE may determine whether it can be considered as SDT_UE or not when the UE needs to establish RRC connection to the eNB (S1302). In the step of S1302, the UE can determine that the UE is the SDT_UE using the SDT_UE flag. For example, if the paging message includes the SDT_UE flag, the UE identifies the UE is the SDT_UE If the UE is considered as SDT_UE, the UE may inform a network that the UE is the SDT_UE by performing the SDT_UE specific access (S1303). The SDT_UE specific access comprises a random access preamble transmission. When the SDT_UE transmits the random access preamble to inform the identification, the random access preamble is used for SDT_UE indicated in the page message. Upon the received random access preamble, the eNB knows that the UE is SDT_UE.

Figure 14:
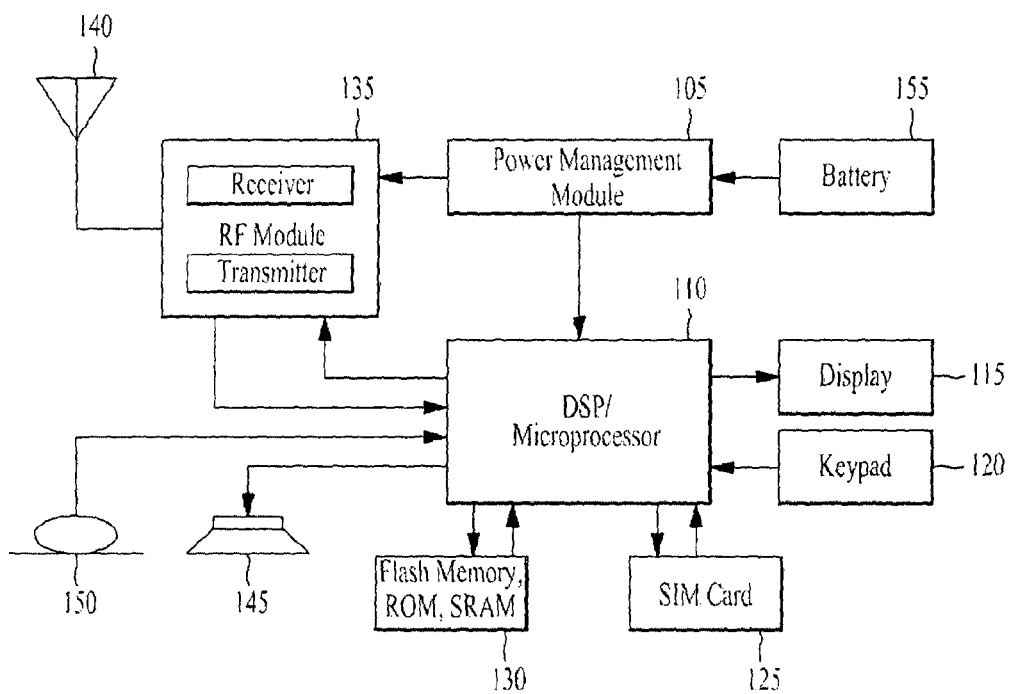
FIG. 14 is a block diagram of a communication apparatus according to an embodiment of the present invention.

FIG. 14 is a block diagram of a communication apparatus according to an embodiment of the present invention.

The apparatus shown in FIG. 14 can be a user equipment (UE) and/or eNB adapted to perform the above mechanism, but it can be any apparatus for performing the same operation.

As shown in FIG. 14, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 14 may represent a UE comprising a receiver (135) configured to receive a request message from a network, and a transmitter (135) configured to transmit the transmission or reception timing information to the network.

These receiver and the transmitter can constitute the transceiver (135). The UE further comprises a processor (110) connected to the transceiver (135: receiver and transmitter).

Also, FIG. 14 may represent a network apparatus comprising a transmitter (135) configured to transmit a request message to a UE and a receiver (135) configured to receive the transmission or reception timing information from the UE. These transmitter and receiver may constitutes the transceiver (135). The network further comprises a processor (110) connected to the transmitter and the receiver. This processor (110) may be configured to calculate a latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in the wireless communication system, the method comprising:
receiving system information including a criterion value of a data size from a base station (BS), wherein the criterion value is to be compared with a size of a data available for transmission (DAT) of the UE;
determining whether the UE is considered as a Machine Type Commnucation_UE (MTC_UE) or not, by comparing the criterion value and the size of the DAT of the UE; and
performing a random access (RA) procedure, wherein the UE transmits a specific RA preamble dedicated for the MTC_UE only if the UE determines that the UE is considered as the MTC_UE, to the BS in the RA procedure.

2. The method of claim 1, further comprising:
receiving a paging message from the BS,
wherein the specific RA preamble is included in the paging message.

3. The method of claim 2,
wherein the paging message further includes a specific time value, and
wherein the UE determines that the UE is considered as the MTC_UE only during the specific time value if the size of the DAT of the UE is less than or equal to the criterion value.

4. The method of claim 1,
wherein the UE determines that the UE is considered as the MTC_UE if the size of the DAT of the UE is less than or equal to the criterion value.

5. The method of claim 4,
wherein the system information further includes a specific time value, and
wherein the UE determines that the UE is considered as the MTC_UE only during the specific time value if the size of the DAT of the UE is less than or equal to the criterion value.

6. The method of claim 1,
wherein the specific RA preamble is included in the system information.

7. A User Equipment (UE) for operating in the wireless communication system, the UE comprising:
an RF module; and
a processor to control the RF module,
wherein the processor configured to:
receive system information including a criterion value of a data size from a base station (BS), wherein the criterion value is to be compared with a size of a data available for transmission (DAT) of the UE;

determine whether the UE is considered as a Machine Type Commnucation_UE (MTC_UE) or not, by comparing the criterion value and the size of the DAT of the UE; and perform a random access (RA) procedure, wherein the UE transmits a specific RA preamble dedicated for the MTC_UE only if the processor determines that the UE is considered as the MTC_UE, to the BS in the RA procedure.

8. The UE of claim 7, wherein the processor is further configured to receive a paging message from the BS, wherein the specific RA preamble is included in the paging message.

9. The UE of claim 8, wherein the paging message further includes a specific time value, and wherein the processor determines that the UE is considered as the MTC_UE only during the specific time value if the size of the DAT of the UE is less than or equal to the criterion value.

10. The UE of claim 7, wherein the UE determines that the UE is considered as the MTC_UE if the size of the DAT of the UE is less than or equal to the criterion value.

11. The UE of claim 10, wherein the system information further includes a specific time value, and wherein the processor determines that the UE is considered as the MTC_UE only during the specific time value if the size of the DAT of the UE is less than or equal to the criterion value.

12. The UE of claim 7, wherein the specific RA preamble is included in the system information.

* * * * *